(12) United States Patent
Bitelli

(10) Patent No.: US 6,286,615 B1
(45) Date of Patent: Sep. 11, 2001

(54) HEAVY VEHICLE FOR BREAKING UP GROUND WITH RETRACTING AND STEERING REAR WHEELS

(76) Inventor: Romolo Bitelli, Via IV Novembre, 2 -, 40061 Minerbio (Bo) (IT)

(*) Notice: Subject to any disclaimer, the term of this patent is extended or adjusted under 35 U.S.C. 154(b) by 0 days.

(21) Appl. No.: 09/531,565

(22) Filed: Mar. 20, 2000

(30) Foreign Application Priority Data

Mar. 23, 1999 (IT) .............................................. VI99A0056

(51) Int. Cl.[7] .................................................. B62D 11/20
(52) U.S. Cl. ......................................... 180/9.46; 180/411
(58) Field of Search .................................. 180/9.44, 9.46, 180/9.48, 411; 280/98, 86, 103

(56) References Cited

U.S. PATENT DOCUMENTS

| | | | |
|---|---|---|---|
| 3,664,448 | * 5/1972 | Hudis | 180/9.46 |
| 3,792,745 | * 2/1974 | Files | 180/9.46 |
| 4,029,165 | * 6/1977 | Miller et al. | 180/6.48 |
| 4,120,507 | * 10/1978 | Miller | 280/840 |
| 4,387,814 | * 6/1983 | Beduhn et al. | 212/195 |

* cited by examiner

*Primary Examiner*—Kevin Hurley
(74) *Attorney, Agent, or Firm*—Dykema Gossett PLLC

(57) ABSTRACT

A machine for breaking up ground including, a frame supported by at least one pair of front wheels or tracks and by at least one pair of rear wheels or tracks. A driver's cab is made out of said frame and a means of breaking up the ground is connected to the frame. A traction system is supported by the frame and is for rotating one or more of the wheels or tracks. At least one rear wheel or track has a horizontal axis belonging to a chassis that is integral with said frame. The chassis is provided with at least one first actuator that works with maneuvering systems accessible from the driver's cab to rotate the rear wheel or track around a vertical axis while turning the front wheels or tracks of the machine.

11 Claims, 6 Drawing Sheets

HEAVY VEHICLE FOR BREAKING UP GROUND WITH RETRACTING AND STEERING REAR WHEELS

BACKGROUND OF THE INVENTION

The invention concerns a heavy vehicle for breaking up ground provided with retracting and steering rear wheels.

It is known that for breaking up ground, specific heavy vehicles are used equipped with wheels or tracks depending on how they are implemented and provided with equipment suited to breaking up the actual ground.

Scarifiers are, for instance, known for this purpose that are heavy vehicles used to break up the bituminous surface covering road courses.

A scarifier fundamentally consists of a frame made of heavy-duty metal bodywork, provided with a ripper drum that is set against the ground to be broken up and is supported by a horizontal shaft around which it is rotated.

The frame, which is shaped to provide a driver's cab where the operator sits, is in turn supported by a pair of front drive wheels or tracks and a pair of rear wheels or tracks, either with drive or free, the latter being located next to the ripper drum. Traction systems, housed in an engine compartment formed out of the frame, set the ripper drum in rotation to break up the ground and the wheels or tracks to move the machine.

The rear wheels or tracks are connected to a sole-plate supported by a hydraulic cylinder that allows a vertical movement to adjust the depth the ripper drum penetrates into the ground while an articulation fixed to the frame and connected to the actual sole-plate allows one or both wheels or tracks to be set in a retracted position inside the frame.

The rear wheels or tracks when extracted from the frame, allow better weight distribution primarily during the machine's use, while the possibility of at least one wheel or one track retracting under the frame, allows the machine to be used for digging right up to the wall of the work area.

What's more the position of one or more of the rear wheels or tracks when retracted into the side of the machine, allows to reduce the machine's overall dimensions and aid road transport when it is moved from one work site to another. Known machines equipped with one or both rear wheels or tracks retractable are extended manually and therefore by operations that are awkward for the operator since, to carry them out he has to get down from the machine and go to one or both of its sides to shift the wheels or tracks.

As an alternative to manual retraction, the depositee of this invention has filed an Italian patent application having protocol number V198U000098 which describes a heavy vehicle for breaking up ground in which the changeover of one or both rear wheels or tracks from extracted to retracted into the frame and vice versa, as well as locking them in their final position, is achieved automatically by controls inside the driver's cab.

One limitation shown by the machine described in the aforementioned patent is that when the rear wheels or tracks are set in their retracted position inside the frame, when turning they scrape the ground with considerable resistance. This problem is particularly accentuated when the machine is fitted with tracks rather than wheels, because in this case the resistance while turning is even higher because of the greater surface area in contact with the ground.

SUMMARY OF THE INVENTION

This invention sets the scope of eliminating this inconvenience by producing a machine for breaking up ground provided with at least one rear steering wheel or track. An additional scope is that these steering wheels or tracks can also retract into the side of the machine.

Said scopes are achieved by producing a machine for breaking up ground that in accordance with the main claim comprising:

a frame supported by at least one pair of front wheels or tracks and by at least one pair of rear wheels or tracks;

at least one driver's cab being part of said frame;

means of breaking up the ground connected to said frame;

traction systems supported by said frame to rotate one or more of said wheels or said tracks;

wherein at least one of said rear wheels or said rear tracks has its horizontal axis belonging to a chassis being a integral part of said frame and having at least one first actuator that works with maneuvering systems accessible from said driver's cab to rotate said rear wheel or track around a vertical axis while turning the machine's front wheels.

According to a preferred form of execution the machine is a scarifier mounted on tracks where the two front tracks are both steering and two rear ones, one being fixed and one retractable and steering.

The means of turning the machine include first actuators that work with the rear wheel or track and second actuators that work with both front wheels or tracks, which consist of hydraulic cylinders supplied by slide valves. In particular the slide valve that operates the steering hydraulic cylinder of the rear track is controlled by solenoid valves, while the slide valve that supplies the hydraulic cylinder for steering the front tracks is controlled directly by the power steering connected to the steering column in the driver's cab. The operation of both hydraulic cylinders is interlinked by means of controls to co-ordinate turning, which include potentiometric position detectors or similar, cooperating mechanically with each hydraulic cylinder and electrically wired to an electronic control unit. This is also electrically wired to the solenoid valves that pilot the slide valves supplying the hydraulic cylinder steering the rear track and a position signal for the rear wheel or track when it is set in its retracted position inside the frame.

An advantage of the scarifier invention is that it is easier to drive above all during turning operations.

Another advantage is that the wear on the tracks is also reduced.

BRIEF DESCRIPTION OF THE DRAWINGS

The aforesaid scopes and advantages will be better illustrated during the description of a preferred form of execution of the invention that is given as a guideline but not a limitation and refers to the attached diagrams where.

DESCRIPTION OF THE INVENTION

Figure 1:
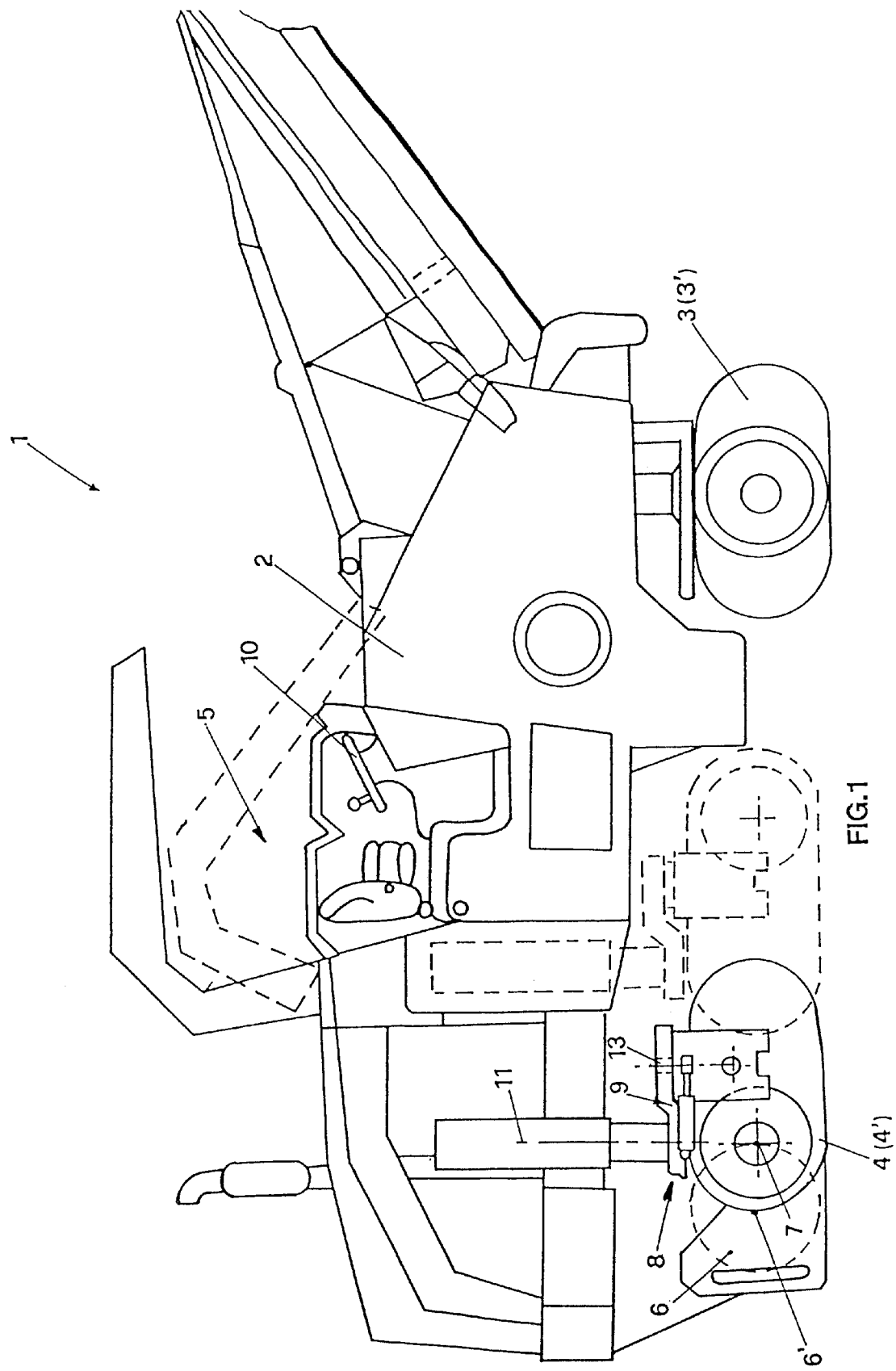
FIG. 1 illustrates a line drawing of the side view of the machine invention.

As seen in FIG. 1 the machine invention, generally indicated by 1, is a scarifier suited for breaking up the bituminous surface that covers road courses. The concepts that will be described below can nevertheless be applied to a machine for breaking up other kinds of terrain.

The scarifier includes a frame 2, supported by a pair of front tracks 3, 3' and by a pair of rear tracks 4, 4', which is shaped to provide a driver's cab generally indicated by 5.

To the rear of the machine and between the rear tracks 4, 4' there is a ripper drum 6 that is rotated around its horizontal axis 6' by traction systems inside the frame 2 and not illustrated here, which by means of gears and mechanisms, again not illustrated here, also rotate one or more of said tracks. It is clear that in different executions the machine invention may be fitted with wheels instead of tracks.

According to the invention at least one of said rear wheels or tracks 4 has its horizontal axis 7 belonging to a chassis 8 being a integral part of said frame 2 and having at least one first actuator 9 that works with maneuvering systems 10 accessible from said driver's cab 5 to rotate said rear wheel or track 4 around a vertical axis 13 while turning the front wheels or tracks 3, 3' of the machine.

In particular the maneuvering systems consist of the machine's steering column 10.

Figure 3:
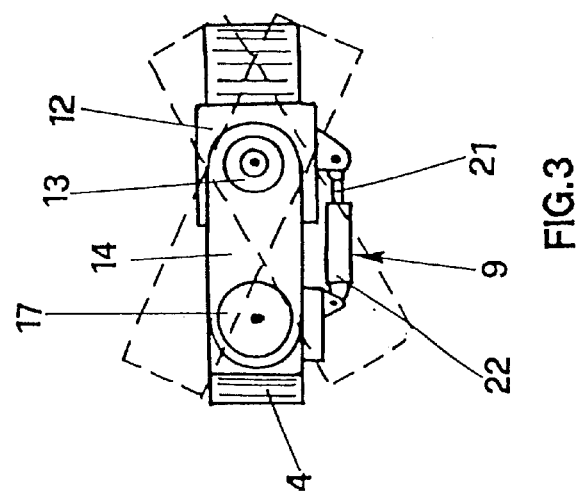
FIG. 3 illustrates an aerial view of the detail in FIG. 2.
Figure 2:
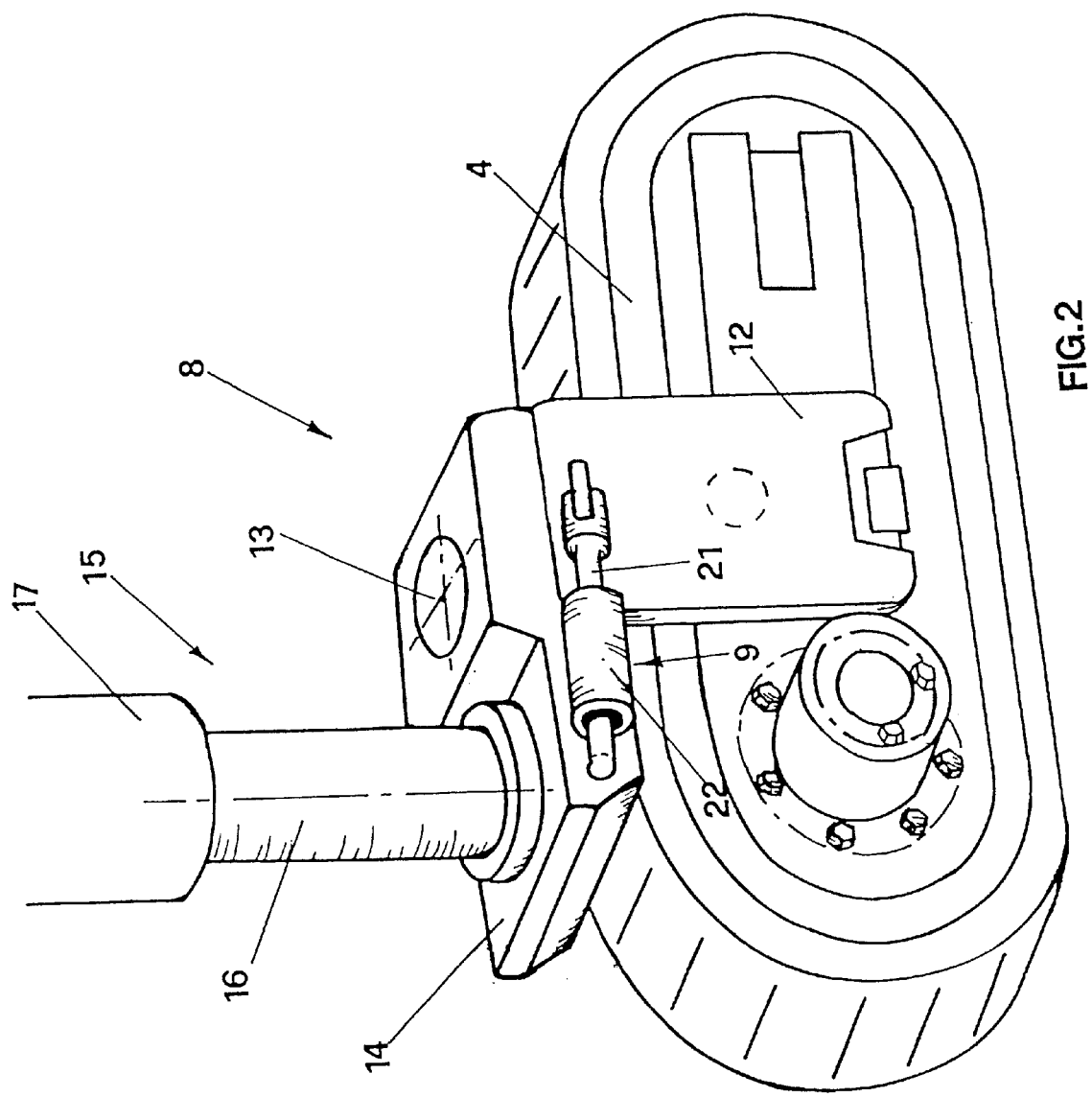
FIG. 2 illustrates in an isometric drawing of a detail of the machine in FIG. 1.

As seen in FIG. 2 and also in FIG. 3 the chassis generally indicated by 8 that support the rear track 4, includes a yoke 12 connected to the track 4, having a vertical pivot journal 13 that is coupled to revolve on a support plate 14 fixed to a second actuator 15 being a integral part of the frame 2.

In detail, as seen in FIG. 2, the second actuator 15 is a second hydraulic jack that has the end of its rod 16 fixed to the plate 14 and the cylinder end 17 where the rod 16 slides, being integral with the frame 2 of the machine.

Figure 4:
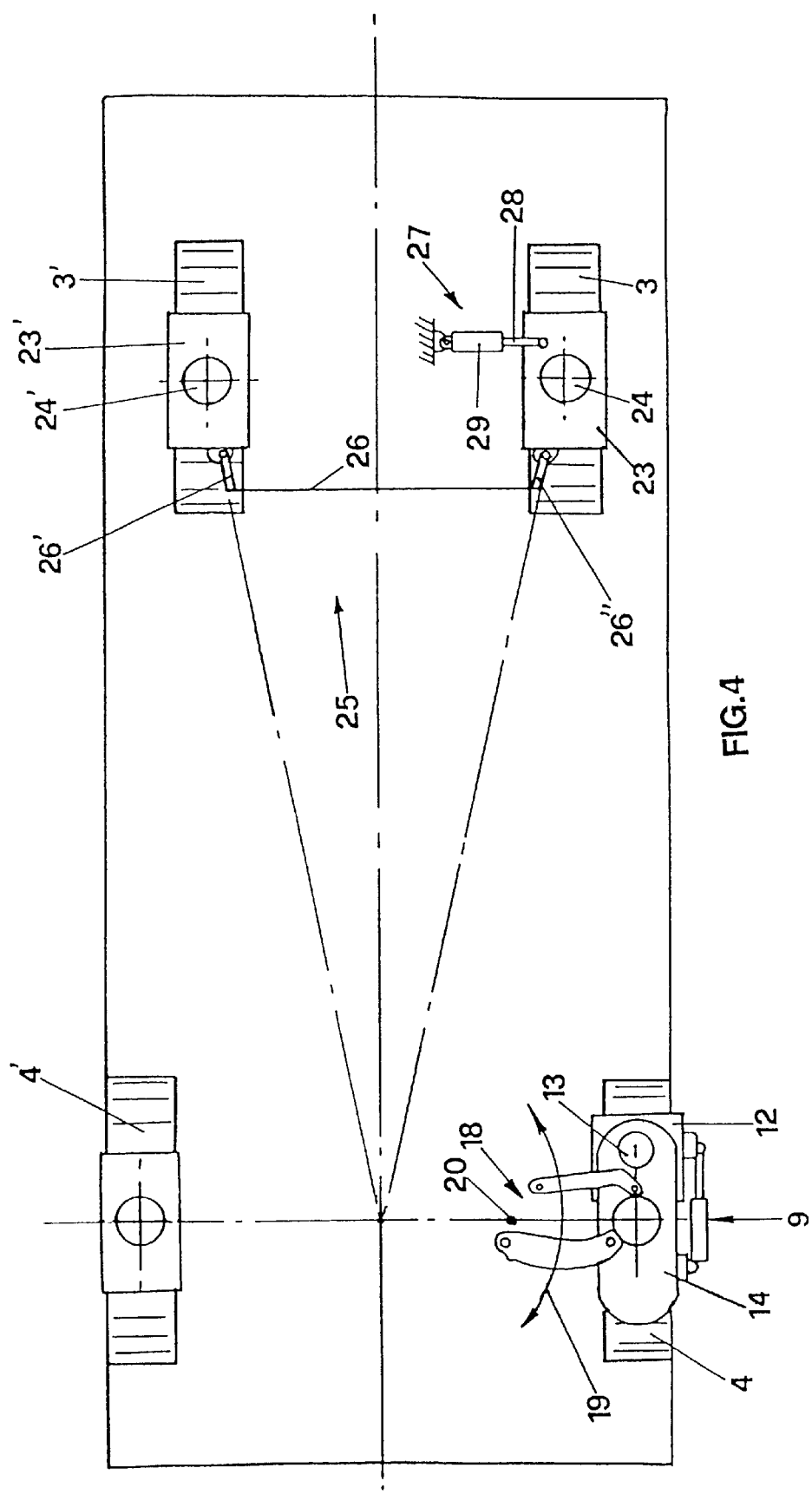
FIGS. 4 to 6 illustrate line drawings of aerial views of the set-up of the tracks on the machine in FIG. 1 in three different working positions.
Figure 5:
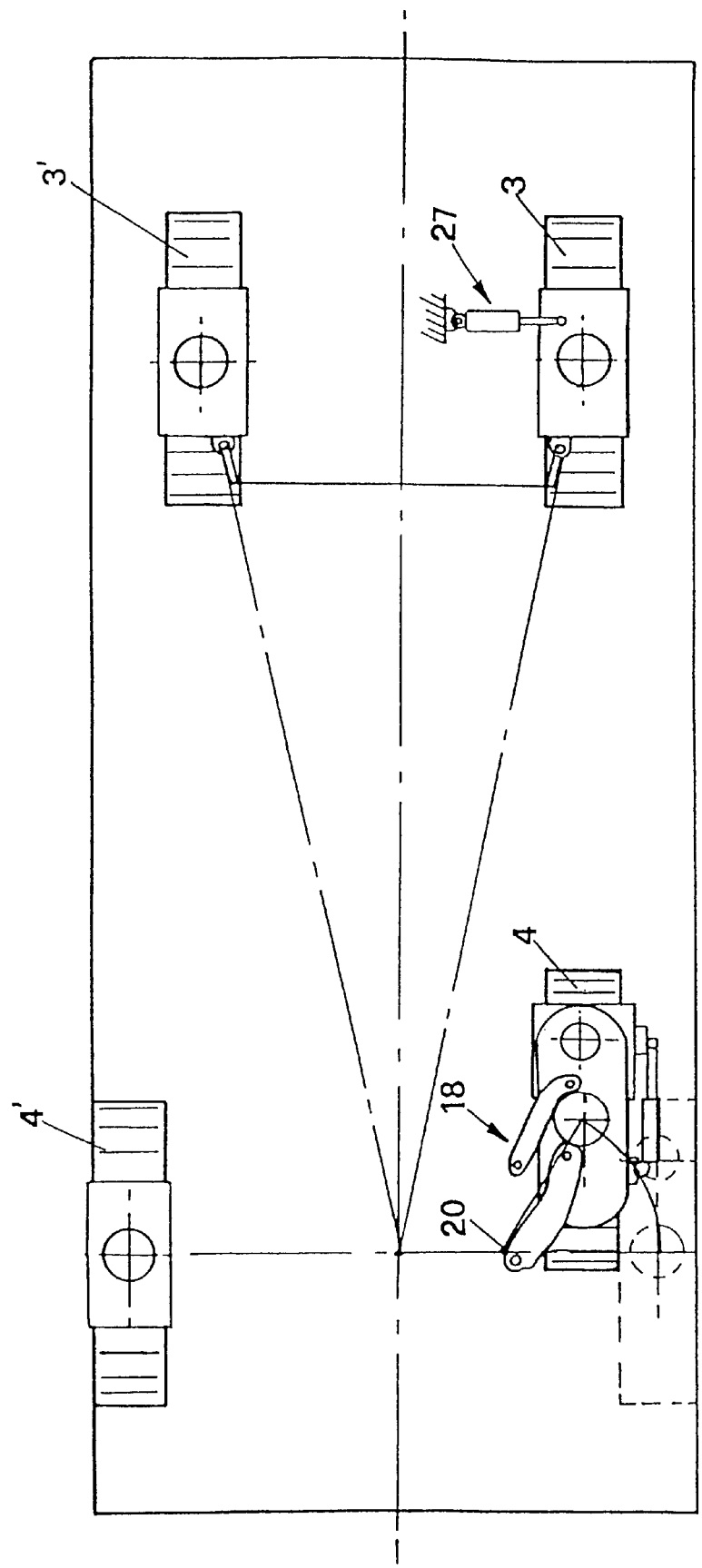

In particular the cylinder 17, as seen in FIG. 4, is connected to the frame 2 by means of a first articulation generally indicated by 18 and of the type described in U.S. Pat. No. 6,173,512. The first actuation group comprises a four-bar linkage wherein the bars 18a and 18b are moved by hydraulic actuators. This allows the whole chassis 8 to move with the track 4 connected to it, in any one of the directions of the arrow 19 with reference to a fixed point 20 on the frame, to retract the track 4 into the frame of the machine as seen in FIG. 1.

With regards to the first actuator generally indicated by 9 and belonging to the chassis 8, it can be seen that it consists of a first hydraulic jack that, as seen in FIGS. 2 and 3, has the rod end 21 hinged to the yoke 12 while the cylinder end 22, where the rod 21 slides, is hinged to the plate 14.

With regards to the front tracks 3, 3' it can be seen in FIG. 4 that each of them is supported by a chassis 23, 23' that couples it to revolve on a pivot journal 24, 24' connected vertically to the frame 2.

The front tracks 3, 3' are moreover interlinked by means of a second articulation generally indicated by 25 that is made up of a central rod 26 hinged to a pair of side rods 26', 26", each of them in turn being hinged to their relative chassis 23, 23' respectively of the front tracks 3, 3'.

It can also be seen that the front track 3 works with a third actuator generally indicated by 27 that consists of a third hydraulic jack having the rod end 28 hinged to the chassis 23 and the cylinder end 29, where the rod 28 slides, hinged to the frame 2 of the machine.

When the rod 28 thrusts in or out of its relative cylinder 29, it forces the chassis 23 to rotate around the vertical axis or pivot journal 24 and by means of the second articulation 25 also transmits this rotation to the front track 3' next to it, making the machine turn.

Figure 7:
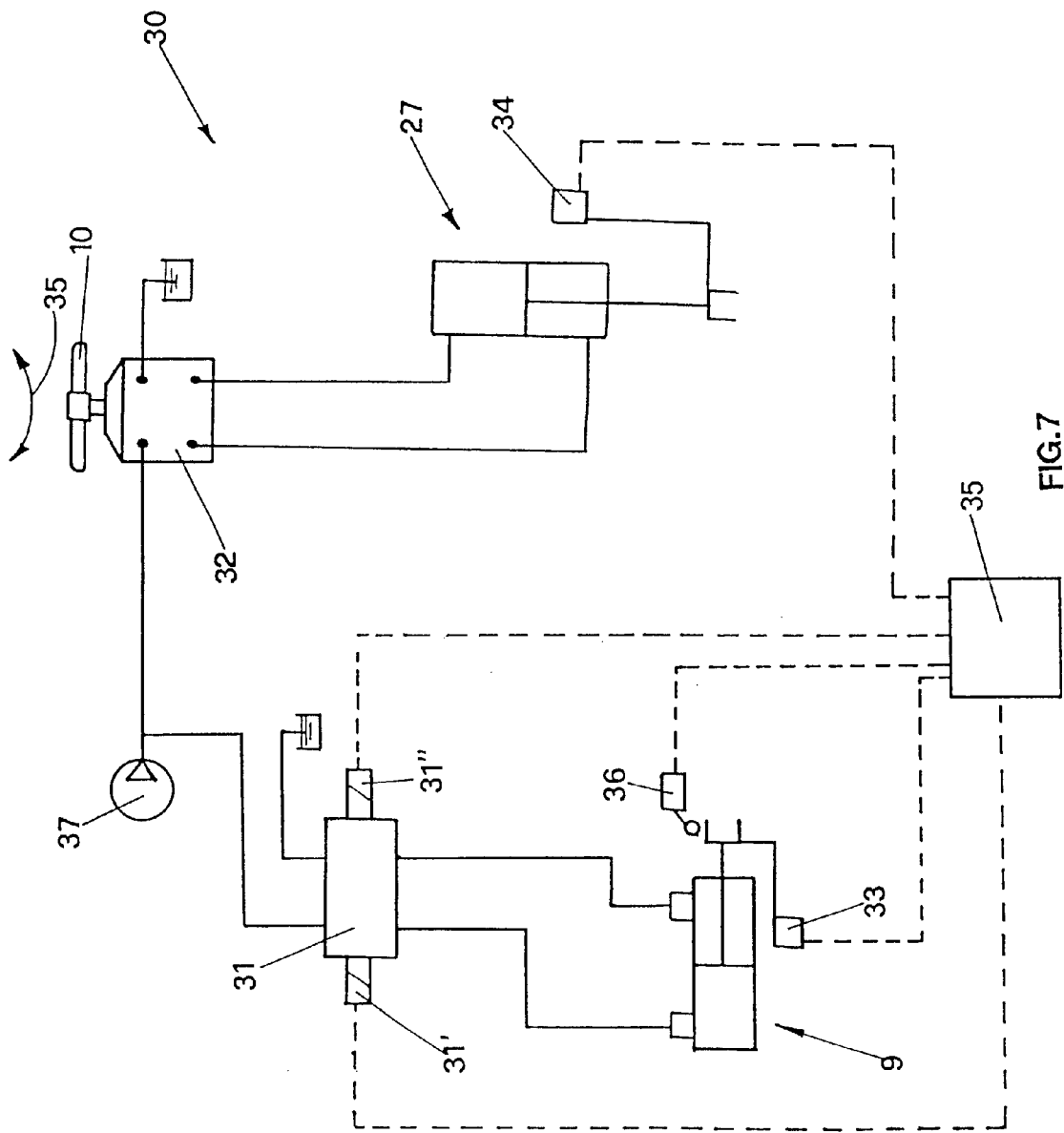
FIG. 7 shows the hydraulic control diagram of the tracks of the machine in FIG. 1 and electrical wiring of the control unit.

It can be seen in FIG. 7 that the first and third hydraulic jacks or first acutator 9 and third actuator 27, respectively, are supplied by the pressurized oil distribution circuit generally indicated by 30. This includes a first slide valve 31 piloted by solenoid valves 31' and 31" that supply the first hydraulic jack 9 and by a third slide valve 32 that is controlled by the steering column or maneuvering system 10 of the machine, which supplies the third hydraulic jack or third actuator 27.

The distribution circuit also includes a first position detector 33 of the first hydraulic jack 9 and a third position detector 34 of the third hydraulic jack 27 that consist of potentiometric position detectors or similar, connected to an electronic control unit 35 for the coordinated control of the turning angles of the front tracks 3, 3' and the rear track 4.

It can be seen that there is also a position signal 36 preferably consisting of a travel switch that detects the retracted position of the rear track 4.

The travel switch 36 together with the potentiometric detectors 33, 34' and the solenoid valves 31', 31", are electrically wired to the electronic control unit 35 that co-ordinates their operation, controlling the turn.

A pump 37 completes the circuit.

Figure 6:
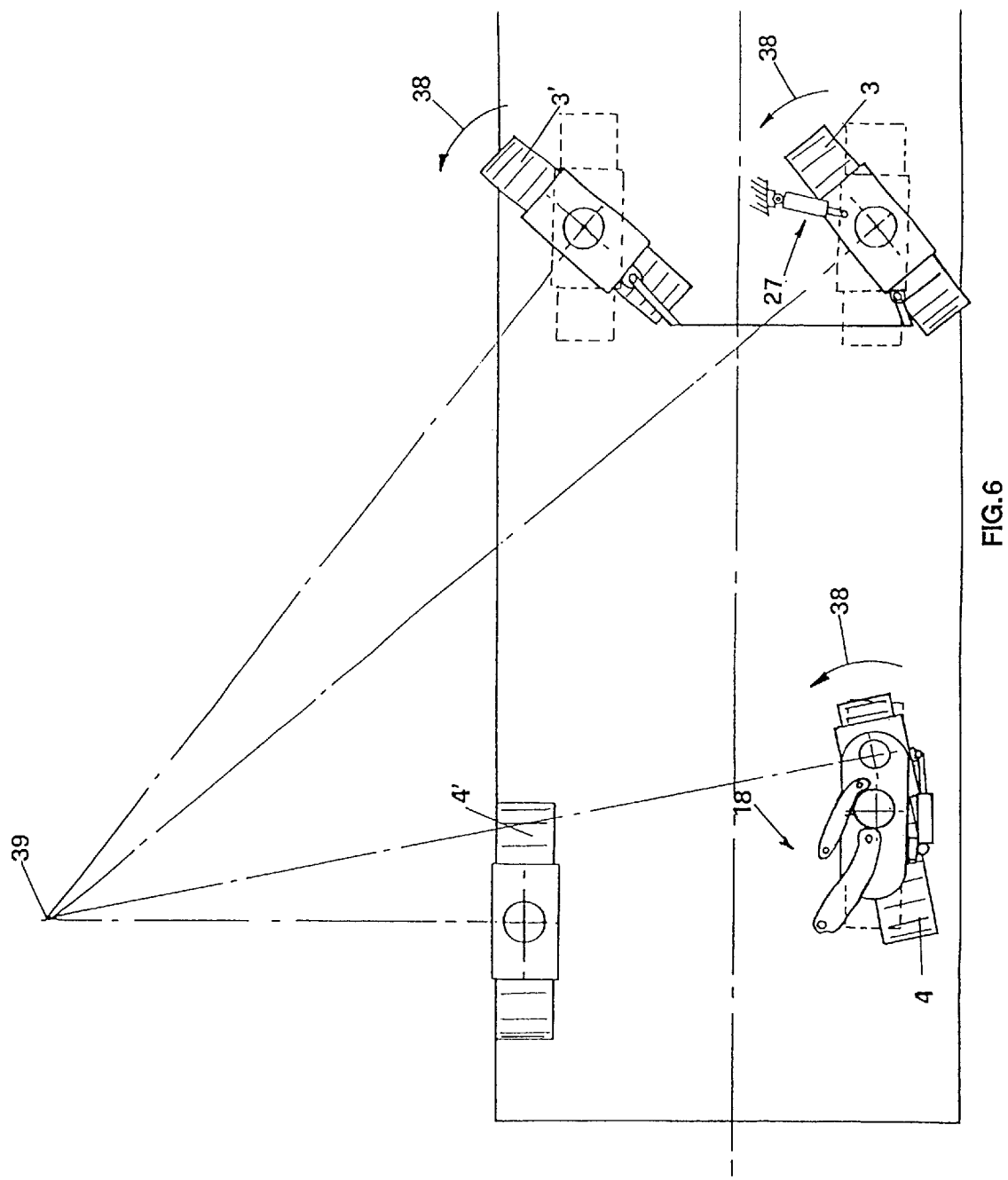

It works so that when the machine's traction systems are operating, adjusting the steering column or maneuvering system 10 by turning it in any of the directions indicated by the arrow 40, pressure is applied to the third actuator or hydraulic jack 27 that turns the front tracks 3, 3', for instance making them turn counterclockwise 38 as illustrated in FIG. 6 around a pivot center 39.

The third position detector 34 transmits the signal to the electronic control unit 35, which operates the solenoid valve 31' or 31" of the first actuator or hydraulic jack 9, causing a rotation also for the track 4 according to a calculated geometry in the 35 same counterclockwise direction 38 around the same pivot center 39.

The third position detector 34 keeps control of how the turn is progressing by sending signals to the electronic control unit 35.

The position signal 36 detects when the rear track 4 is in its retracted position inside the frame that can be seen in FIG. 6.

It is nevertheless clear that the rear track 4 can also be turned when it is in its extracted position.

The track 4 is set in its retracted position inside the frame and then is reset in the extracted position that can be seen in FIG. 4 by acting from inside the driver's cab by means of control systems of the first articulation 18, that has not been illustrated, that is thereby made to turn in any of the directions of the arrow 19 and whose operation is illustrated in U.S. Pat. No. 6,173,512.

The above description amply shows that the machine invention achieves all the set scopes.

In a different form of execution, the machine invention may have both rear tracks steering.

In the execution phase, the machine invention may undergo changes or variations in construction all falling under the protection of the main claim that shall therefore all be considered protected by this patent.

What is claimed is:

1. A steerable machine for breaking up ground comprising:
   a frame;
   at least one pair of rollable front supports and at least one pair of rollable rear supports, each of said front and rear supports including a chassis secured to the frame and said front supports being rotatable about a front vertical axis and at least one of the rear supports being pivotable about a rear vertical axis;

said chassis includes a yoke that supports said rear support, and has a vertical pivot journal coupled to revolve on a support plate fixed to an end of a second actuator;

said second actuator comprises a second hydraulic jack set with a vertical axis, which has a second rod with a second rod end fixed to said plate and a second cylinder end, wherein said rod slides, integral with said frame;

the cylinder of said second hydraulic jack is an integral part of said frame being connected thereto by means of a first articulation for moving said chassis with respect to a fixed point on said frame in order to move the rear rotatable support inward of said frame;

at least one driver's cab located in said frame;

a means for breaking up the ground connected to said frame;

traction means supported by said frame for rotating at least one of said rotatable supports;

at least one first actuator operatively coupled to the rear supports;

a maneuvering system accessible from said driver's cab for operating the actuator for rotating said rear supports about the rear vertical axis while turning the front supports of the machine.

2. The machine according to claim 1, wherein:

said first actuator comprises a first hydraulic jack having a first rod with a first rod end fixed to said yoke and a first cylinder end, wherein said rod slides, fixed to said plate.

3. The machine according to claim 1, wherein:

the chassis of said front supports are interlinked by means of a second articulation, at least one of said chassis cooperating with a third actuator for rotating the chassis around a vertical axis.

4. The machine according to claim 3, wherein:

said third actuator comprises a third hydraulic having a third rod with a third rod end pivoted to said chassis of said front support and a third cylinder end, wherein said rod slides, pivoted on said frame.

5. The machine according to claim 1, wherein:

said jacks comprise hydraulic two-way jacks connected to a distribution circuit of oil under pressure.

6. The machine according to claim 5, wherein:

said distribution circuit comprises:
 a first slide valve piloted by solenoid valves that supply said first hydraulic jack;
 a third slide valve controlled by said maneuvering system of said machine that supply said third hydraulic jack;
 a first position detector cooperating with said first hydraulic jack;
 a third position detector cooperating with said third hydraulic jack;
 an electronic control unit electrically coupled to said position detectors, to said position signal and to said solenoid valves of said first slide valve.

7. The machine according to claim 6, wherein:

said position detectors comprise potentiometric detectors.

8. The machine according to claim 6, further comprising:

a position signal of said rear wheel or track, said position signal comprising a travel switch being wired to said electronic control unit.

9. A steerable machine for breaking up ground comprising:

a frame;

at least one pair of rollable front supports, said front supports being rotatable about a front vertical axis and front steering means controlled by power steering for steering said front supports;

at least one pair of rollable rear supports, said rear supports being pivotable about a rear vertical axis and rear steering means controlled by at least one steering hydraulic cylinder for steering said rear supports;

at least one driver's cab located in said frame;

a means for breaking up the ground connected to said frame;

traction means supported by said frame for rotating at least one of said rollable supports;

a maneuvering system accessible from said driver's cab for operating said front steering means and said rear steering means at the same time, from said driver's cab.

10. The steerable machine for breaking up ground as claimed in claim 9, wherein:

said front steering means is comprised of a second actuator having a hydraulic steering cylinder supplied by slide valves for working with said front supports;

said rear steering means is comprised of a first actuator having a steering hydraulic cylinder supplied by slide valves for working with said rear supports;

said power steering of said front steering means is connected to a steering wheel in said driver's cab and controls said slide valves;

said solenoid valves of said rear steering means control said slide valves; and said maneuvering system having a control means interlinking said steering hydraulic cylinders, and controlling coordinated turning of both said front supports and said rear supports.

11. The steerable machine for breaking up ground as claimed in claim 10, wherein:

said control means further comprises potentiometric position detectors in mechanical connection with each steering hydraulic cylinder, and electrically connected to an electronic control unit.

* * * * *